(12) United States Patent
Cheng et al.

(10) Patent No.: US 12,450,233 B1
(45) Date of Patent: Oct. 21, 2025

(54) METHOD OF INCORPORATING BLOOM FILTER INTO COST-BASED BOTTOM-UP QUERY OPTIMIZATION AND COMPUTING DEVICE

(71) Applicant: Huawei Cloud Computing Technologies Co., Ltd., Gui'an New District (CN)

(72) Inventors: Qi Cheng, Markham (CA); Per-Ake Larson, Etobicoke (CA); Timothy James Zeyl, Markham (CA); Chong Chen, Markham (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 0 days.

(21) Appl. No.: 18/747,670

(22) Filed: Jun. 19, 2024

(51) Int. Cl.
*G06F 16/2453* (2019.01)
*G06F 11/34* (2006.01)
*G06F 16/2455* (2019.01)

(52) U.S. Cl.
CPC .... *G06F 16/24545* (2019.01); *G06F 11/3409* (2013.01); *G06F 16/2456* (2019.01)

(58) Field of Classification Search
None
See application file for complete search history.

(56) References Cited

U.S. PATENT DOCUMENTS

2015/0278306 A1\* 10/2015 Cheng ............... G06F 16/24545
707/714

OTHER PUBLICATIONS

Ding, B. et al., "Bitvector-aware Query Optimization for Decision Support Queries," SIGMOD '20, https://doi.org/10.1145/3318464.3389769, Jun. 14-19, 2020, Portland, OR, USA, 16 pages.

\* cited by examiner

*Primary Examiner* — Kannan Shanmugasundaram
(74) *Attorney, Agent, or Firm* — Slater Matsil, LLP

(57) ABSTRACT

A method of incorporating a bloom filter (BF) into cost-based bottom-up query optimization includes: receiving a query including a request to join at least two data tables that include a first data table and a second data table; generating, in response to the request, at least two query plans that includes a first query plan including subplans to: create the BF based on the second data table, apply the BF to the first data table for filtering data of the first data table before the first data table is joined with another data table, and join the first data table with the another data table; submitting the at least two query plans to a cost-based bottom-up optimizer to obtain a target query plan; and providing, as a response to the received query, a set of data that is retrieved from a data retrieval system by executing the target query plan.

18 Claims, 6 Drawing Sheets

METHOD OF INCORPORATING BLOOM FILTER INTO COST-BASED BOTTOM-UP QUERY OPTIMIZATION AND COMPUTING DEVICE

TECHNICAL FIELD

The present disclosure relates to the field of database technologies, and in particular to a method of incorporating a bloom filter (BF) into cost-based bottom-up query optimization and a computing device.

BACKGROUND

In a database management system (DBMS), a cost-based optimization (CBO) method can be used to select an optimal query plan, and a structured query language (SQL) statement may be executed based on the selected optimal query plan.

SUMMARY

The present disclosure provides a method of incorporating a bloom filter (BF) into cost-based bottom-up query optimization and a computing device, which ameliorates the problem of low optimality in selecting an optimal query plan.

In a first aspect, a method of incorporating a BF into cost-based bottom-up query optimization is provided. The method is performed by a DBMS. The method includes: receiving a query that includes a request to join at least two data tables, the at least two data tables including a first data table and a second data table; generating, in response to the received request, at least two query plans including a first query plan, the first query plan including subplans to: create the BF based on the second data table, apply the created BF to the first data table for filtering data of the first data table before the first data table is joined with another data table, and join the first data table with the another data table; submitting the at least two query plans to a cost-based bottom-up optimizer to obtain a target query plan; and providing, as a response to the received query, a set of data that is retrieved from a data retrieval system by executing the obtained target query plan.

In the present disclosure, the BF is involved in the process of generating the at least two query plans, so that the cost of the BF can be considered during selecting the target query plan from the at least two query plans. Therefore, it helps to improve the optimality of selecting the optimal query plan from the at least two query plans.

In a possible implementation, the subplan of creating the BF includes operations to: for a join of the at least two data tables, scan the second data table; and create the BF based on the second data table. The subplan of applying the created BF to the first data table includes operations to: scan the first data table; and apply the created BF to a scan plan to filter data of the first data table, so as to obtain a plan where the BF is applied. The subplan of joining the first data table with the another data table includes operations to: join the filtered first data table and the another data table in the at least two data tables.

In this implementation, when the BF is applied to the first data table, the DBMS may accurately estimate the number of rows and cost of the first data table with the applied BF. The number of rows and cost enable finding a better query plan.

In a possible implementation, submitting the at least two query plans to the cost-based bottom-up optimizer to obtain the target query plan, includes: submitting the at least two query plans to the cost-based bottom-up optimizer to obtain costs of the at least two query plans, wherein a cost of the first query plan in the at least two query plans includes a cost of building the BF and a cost of applying the BF; and determining the target query plan based on the costs of the at least two query plans.

In this implementation, the cost of the first query plan includes the cost of creating the BF and the cost of applying the BF, that is, the DBMS considers the cost of creating the BF, the cost of applying the BF and the join cost after applying the BF in the process of determining the target query plan. Therefore, it can more accurately determine (or select) the optimal query plan from the at least two query plans.

In a possible implementation, generating the at least two query plans includes: determining whether to create and apply the BF before a join between the at least two data tables based on a target information, a query plan generated in a case where the created BF is applied before the join being the first query plan, and generating the at least two query plans based on the determination. The target information includes at least one of: a semantic information of the join, a filtering capacity represented by a join predicate corresponding to the join, or a data amount of a data table associated with the join.

In this implementation, the DBMS can determine the matching relationship between the data tables associated with the join based on the semantic information of the join. The matching relationship can affect the filtering effect of the BF. Therefore, the DBMS can determine whether to create and apply the BF before the join based on the semantic information of the join. The filtering capability represented by the join predicate corresponding to the join or the data amount of the data table associated with the join may affect the effect of creating and applying the BF to perform data filtering on the data table associated with the join. Therefore, the DBMS may determine whether to create and apply the BF before the join based on at least one of: the filtering capability represented by the join predicate corresponding to the join and the data amount of the data table associated with the join.

In a possible implementation, the target information includes the semantic information of the join, and the join is used to join a data table on a creating side of the BF with a data table on an applying side of the BF out of the at least two data tables, wherein determining whether to create and apply the BF before the join based on the target information includes: determining not to create the BF based on the data table on the creating side of the BF and not to apply the BF to the data table on the applying side of the BF before the join, in a case where the semantic information indicates that a primary key of the data table on the creating side of the BF is joined with a foreign key of the data table on the applying side of the BF and no filter predicate exists in the data table on the creating side of the BF.

In this implementation, if the semantic information indicates that the primary key of the data table on the creating side of the BF is joined with the foreign key of the data table on the applying side of the BF and there is no filter predicate in the data table on the creating side of the BF, it means that the data table on the creating side of the BF and the data table on the applying side of the BF are successfully matched. For example, for each row of data in the foreign key of the data table on the applying side of the BF, there is a corresponding data value in the primary key of the data table on the creating side of the BF, which means that the join will not filter out any data, so that it is meaningless to apply the BF to the data table on the applying side of the BF. Therefore, the BF is not created based on the data table on the creating side of the BF and is not applied to the data table on the applying side of the BF before the join.

In a possible implementation, the target information includes the semantic information of the join and the filtering capacity represented by the join predicate corresponding to the join, and the join is used to join a data table on a creating side of the BF with a data table on an applying side of the BF out of the at least two data tables, wherein determining whether to create and apply the created BF before the join based on the target information includes: determining to create the BF based on the data table on the creating side of the BF and apply the created BF to the data table on the applying side of the BF before the join if the filtering capacity represented by the join predicate corresponding to the join is greater than a capacity threshold in at least one case where: the semantic information indicates that a primary key of the data table on the creating side of the BF is joined with a field other than a foreign key of the data table on the applying side of the BF, the semantic information indicates that a field other than the primary key of the data table on the creating side of the BF is joined with the foreign key of the data table on the applying side of the BF, the semantic information indicates that the field other than the primary key of the data table on the creating side of the BF is joined with the field other than the foreign key of the data table on the applying side of the BF, the semantic information indicates that at least one of the primary key of the data table on the creating side of the BF or the foreign key of the data table on the applying side of the BF does not exists, or a filter predicate exists in the data table on the creating side of the BF.

In this implementation, if at least one of the above cases exists, it means that some of the rows in the data table on the creating side of the BF do not to match the data table on the applying side of the BF; it may also be understood that some data in the data table on the applying side of the BF does not have corresponding data in the data table on the creating side of the BF, that is, the join (or the join predicate corresponding to the join) can filter out some data in the data table on the applying side of the BF. In this case, the DBMS may determine whether the filtering capacity represented by the join predicate corresponding to the join is greater than the capacity threshold. If the filtering capacity represented by the join predicate is greater than the capacity threshold, it means that the join predicate can filter out a large amount of data or data records in the data table of the applying side of the BF. In this case, the DBMS determines to create the BF based on the data table on the creating side of the BF and apply the created BF to the data table on the applying side of the BF before the join. That is, the DBMS can apply the BF when the join predicate corresponding to the join can filter a large amount of data, thereby filtering the data in the data table on the applying side of the BF based on the created BF, which can improve the effectiveness of the subsequent join or other operators.

In a possible implementation, the target information includes the semantic information of the join and the data amount of the data table associated with the join, and the join is used to join two data tables out of the at least two data tables, wherein the two data tables include the data table on the creating side of the BF and the data table on the applying side of the BF, and determining whether to create and apply the BF before the join based on the target information includes: determining to apply the created BF to a data table having a larger data amount in the two data tables before the join in at least one case where: the semantic information indicates that a primary key of the data table on the creating side of the BF is joined with a field other than a foreign key of the data table on the applying side of the BF, the semantic information indicates that a field other than the primary key of the data table on the creating side of the BF is joined with the foreign key of the data table on the applying side of the BF, the semantic information indicates that the field other than the primary key of the data table on the creating side of the BF is joined with the field other than the foreign key of the data table on the applying side of the BF, the semantic information indicates that at least one of the primary key of the data table on the creating side of the BF or the foreign key of the data table on the applying side of the BF does not exists, or a filter predicate exists in the data table on the creating side of the BF.

In this implementation, if at least one of the above cases exists, it means that some of the rows in the data table on the creating side of the BF fails to match the data table on the applying side of the BF. It can also be understood that, some data in the data table on the applying side of the BF does not correspond to data in the data table on the creating side of the BF. That is, the join (or the join predicate corresponding to the join) can filter out some data in the data table on the applying side of the BF. In this case, the DBMS can determine the amount of data in each data table of at least two data tables associated with the join, e.g., determine the amount of data that can be filtered based on the BF when the BF is applied to each data table. The larger the amount of data in the data table, the larger the amount of data that can be filtered when the BF is applied to the data table. That is, before the join, the DBMS can apply the created BF to the data table with larger data amount among the at least two data tables, so as to reduce the number of subplans during the bottom-up query optimization, leading to smaller search space and faster query optimization.

In a possible implementation, the method further includes: in a case where it is determined to apply at least two BFs to a same data table associated with the join between the at least two data tables based on the target information, the at least two BFs including at least one first BF and at least one second BF, a filtering capacity of the at least one first BF being lower than a filtering capacity of the at least one second BF, discarding the at least one first BF before the join.

In this implementation, if it is determined that at least two BFs are applied to the same data table, the DBMS may discard a BF with a lower filtering capability (i.e., the at least one first BF) and retain a BF with a higher filtering capability (i.e., the at least one second BF). In this way, it helps to ensure that the query plan has a certain filtering effect while reducing the cost increased by applying the BF with poor filtering capability.

In a possible implementation, the at least two query plans further include a second query plan, and the BF is applied to filter data of the first data table in both the first query plan and the second query plan; the method further includes pruning the second query plan; and pruning the second query plan includes: determining that a cost of the second query plan is higher than a cost of the first query plan; and discarding the second query plan from the at least two query plans to obtain updated at least two query plans.

In this implementation, for the plurality of query plans that join the same data tables and use the same BFs to filter data in the same data tables, the DBMS can pre-prune (or pre-discard) a query plan with higher cost and retain a query plan with lower cost, thereby reducing the search space of the optimizer and improving the filtering efficiency of the target query plan.

In a second aspect, a computing device is provided, including a memory and at least one processor connected to the memory. The memory is configured to store computer program code, and the computer program code includes computer instructions that, when executed by at least one processor, cause the computing device to perform the method of incorporating the BF into cost-based bottom-up query optimization involved in the first aspect and any possible implementation in the first aspect.

In a possible implementation, the functions of the DBMS in the first aspect and any possible implementation in the first aspect can be realized by the processor executing the computer instructions stored in the memory.

In a third aspect, a non-transitory computer-readable storage medium is provided, which has stored computer instructions that, when executed on a computing device, cause the computing device to perform the method of incorporating the BF into cost-based bottom-up query optimization involved in the first aspect and any possible implementation in the first aspect.

In a fourth aspect, a computer program product is provided, which includes computer program instructions carried on a non-transitory computer-readable storage medium. The computer program instructions, when executed on a computing device, cause the computing device to perform the method of incorporating the BF into cost-based bottom-up query optimization involved in the first aspect and any possible implementation in the first aspect.

In addition, as for beneficial effects of the computing device in the second aspect, beneficial effects of the non-transitory computer-readable storage medium in the third aspect, and beneficial effects of the computer program product in the fourth aspect, reference can be made to the beneficial effects described in the first aspect and any possible implementation method of the first aspect, and details will not be repeated here.

DETAILED DESCRIPTION OF ILLUSTRATIVE EMBODIMENTS

Figure 1:
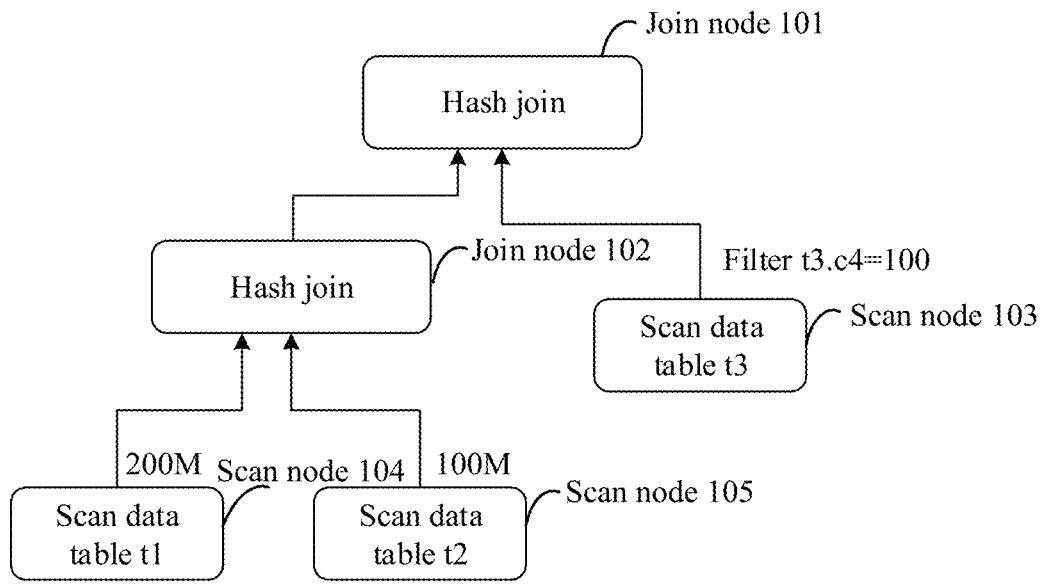
FIG. 1 is a schematic structural diagram of an optimal query plan, in accordance with embodiments of the present disclosure.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The term "and/or" merely describes an association of associated objects, which include three situations. For example, "A and/or B" refers to three situations: A alone, A and B, and B alone.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features, and the terms "first" and "second" are not used to describe a specific order of the objects.

In the description of the embodiments of the present disclosure, the term "multiple", "a plurality of" or "the plurality of" means two or more unless otherwise specified, and "multiple", "a plurality of" or "the plurality of" may also be described as "at least two".

In addition, the phrase "based on" used herein has an open and inclusive meaning, since a process, step, calculation or other action that is "based on" one or more of the stated conditions or values may, in practice, be based on additional conditions or values exceeding those stated.

Firstly, some of the technical terms involved in embodiments of the present disclosure will be explained below.
1) Query plan, also referred to as execution plan, is a detailed set of steps and algorithms for a database management system (DBMS) to execute SQL statements. These steps and algorithms describe how to retrieve or modify data, including how to join data tables, how to filter data, and how to perform other related operations. The query plan is generally expressed by a tree structure, consisting of a series of operators and edges. Each node in the tree indicates an operator. The DBMS executes operations specified in the query plan to complete the query or update operation of the SQL statement.

2) Join plan is an important part of the query plan and describes how the DBMS joins a plurality of data tables involved in the query to obtain a query result. In the join plan, the join manner and join order of the data tables can be specified.

Join manner, also known as join mode, is the way that the DBMS chooses to join data tables when executing a query. The DBMS will evaluate multiple possible join manners and select the most efficient one. Commonly, the join manners include: hash join, nested-loop join, sort-merge join, and merge join.

The join order is the order in which the DBMS joins data tables when executing a query. When executing the SQL statement, when selecting data tables after the FROM keyword, the DBMS will access these data tables in the specified order. The purpose of optimizing the join order is to reduce the amount of data scanned, avoid unnecessary full table scans, and use indexes as much as possible to speed up queries. A common optimization strategy is "small table driving large table", that is, placing the data table with smaller data volume at the front in the connection sequence to reduce the data volume of the intermediate result set. Additionally, if a table has a valid index that can be used in the join operation, it is usually beneficial to place the table earlier in the join order.

3) Scan plan, is an important part of the query plan. It describes how the DBMS scans or accesses records in the data table to obtain data that meets the query conditions. The scan plan is the basis of the join plan. In the scan plan, DBMS can use different scan methods to scan the data table.

The scan method, also known as the data retrieval method, is a method of scanning the data table in the database to find data that meets the conditions. Generally, it includes sequential scan and index scan. Sequential scan is also called full table scan.

4) Cost based optimization (CBO), is used to select the optimal query plan/best query plan for executing SQL statements. The CBO selects the optimal query plan by evaluating the costs of various possible query plans. CBO considers multiple factors, including the size of the data table, index usage, query conditions, data distribution, and statistical information to determine the optimal query plan.

Bottom-up optimizer plans queries from the bottom of the query tree, generally using dynamic programming or some other algorithm to obtain the optimal access plan.

The cost-based bottom-up optimizer is a key component in DBMS. It works by querying from the bottom up along the tree structure, usually using algorithms such as dynamic programming to obtain the optimal query plan.

5) Bloom filter (BF) consists of a binary vector and a random mapping function, and is used to encode whether an element is a member of a set.

6) Join (or join operation) allows data from two or more tables to be associated together and return a result set. For the connection between two data tables, it can be specifically a connection between the primary key in one data table and the foreign key in another data table, or it can be a connection between other fields in one data table and other fields in another data table.

The primary key is a field or combination of fields used to uniquely identify records in the database. It is a key data column in a data table that can uniquely identify each row of records in the data table. In many database systems, the primary key allows you to quickly and accurately retrieve, update, and delete data in a table. For a data table, one or more fields can be set as the primary key, and a field in another data table can be set as a foreign key to establish a connection between the two data tables.

7) Filter predicates refer to conditions for further filtering query results during the execution of the query plan, which are used to reduce the number of result rows and improve query performance. The filter predicates may include a local predicate and a join predicate.

The local predicate is a filtering condition used to limit the number of records returned during the query process. If there is no local predicate, the query results will return all matching records, including duplicate records.

The join predicate is a field in a query plan that is used to join two data tables to obtain related data during the execution of the query plan. The join predicates include equijoin (=), non-equijoin, etc. The most common join predicate is the equijoin, which is used to retrieve records with the same values in two tables. The non-equijoin is used to retrieve records with different values in two data tables.

In the related art, the DBMS selects an optimal query plan without considering BFs, and then add a BF to the optimal query plan to reduce rows involved in the join in the data table during execution. Since the cost of creating the BF, cost of applying the BF and the impact of bloom filter on join are not considered in the process of selecting the optimal query plan, the optimal query plan may in fact not be the best, causing a low optimality of the optimal query plan.

For example, if a SQL statement is:
SELECT*FROM t1, t2, t3
WHERE t1.c1=t2.c2 AND t1.c1=t3.c3 AND t3.c4=100

The SQL statement is used to obtain, from data tables t1, t2, and t3, records that meet conditions: t1.c1=t2.c2, t1.c1=t3.c3, t3.c4=100.

FIG. 1 shows a tree structure of an optimal query plan without BFs based on the SQL statement. The optimal query plan includes: a join node 101, a join node 102, a scan node 103, a scan node 104, and a scan node 105. The join node 101 joins the scan node 103 and the join node 102, and the join node 102 joins the scan node 104 and the scan node 105.

The scan node 104, the scan node 105, and the scan node 103 are used to scan a data table t1, a data table t2, and a data table t3, respectively.

The join indicated by the join node 102 is used to join the data table t1 and the data table t2. The join indicated by the join node 101 is used to join the data table t1 and the data table t3. The join indicated by the join node 101 and the join node 102 is a hash join.

In addition, Filter t3.c4=100 shown in FIG. 1 is a query condition in the SQL statement, and is used to obtain data that satisfies the query condition.

Figure 2:
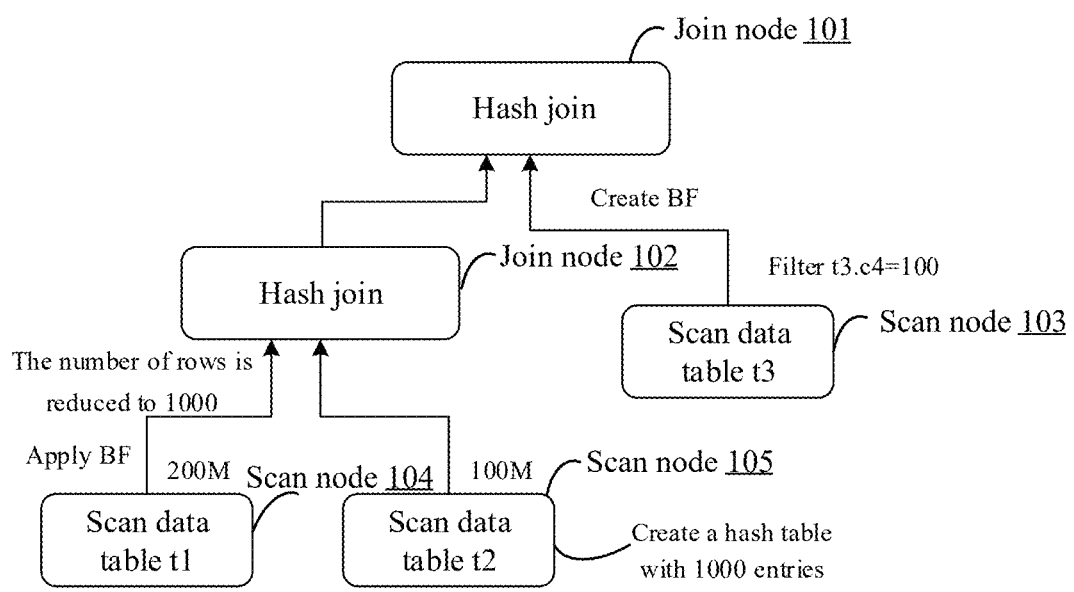
FIG. 2 is a schematic structural diagram of an optimal query plan with a BF, in accordance with embodiments of the present disclosure.

FIG. 2 shows a manner for adding a BF to the optimal query plan, which is to create the BF based on the data table t3 and apply the BF to the data table t1. Assuming that the number of rows in the data table t1 is 200 million (M) entries, the number of rows of the data table t1 will be reduced to 1000 entries by applying the BF to the data table t1.

In addition, assuming that the number of rows in data table t2 is 100 M entries, in the process of creating the join indicated by the join node 102 (e.g., the hash join), the DBMS needs to create a 100 M entry hash table from the data table t2.

Subsequently, the DBMS executes the SQL statement based on the optimal query plan with the BF added.

However, in the above process of adding the BF to the optimal query plan, the impact of the BF on the cost of the optimal query plan is not considered. In this way, the optimal query plan without BFs selected by the DBMS may not be the query plan with BFs with the lowest cost, so that the optimality of the selected optimal query plan cannot be guaranteed.

In light of this, the embodiments of the present disclosure provides a method of incorporating a BF into cost-based bottom-up query optimization. The BF is involved in the process of generating the at least two query plans, so that the cost of the BF can be considered when selecting the target query plan from the at least two query plans. Therefore, it helps to improve the optimality of selecting the optimal query plan from the at least two query plans.

The technical solutions provided in the embodiments of the present disclosure can be applied to data retrieval scenarios (including but not limited to database scenarios, data lake scenarios, data virtualization scenarios, and distributed and federated database scenarios). For example, in the database scenarios, the DBMS may perform the method of incorporating the BF into cost-based bottom-up query optimization to obtain a target query plan and execute it to retrieve a set of data from the database as a response to the query. Correspondingly, in other scenarios (such as data lake scenarios), after the DBMS obtains the target query plan and executes it, the DBMS may also retrieve a set of data from the data lake as a response to the query.

In some embodiments, a query optimization device for executing the method of incorporating the BF into bottom-up query optimization provided in the embodiments of the present disclosure is a computing device. For example, the computing device may be a server, a desktop computer, a mobile phone, a tablet computer, or a personal computer (e.g., an ultra-mobile personal computer (UMPC)), etc. The embodiments of the present disclosure do not limit the specific type and structure of the computing device.

Figure 3:
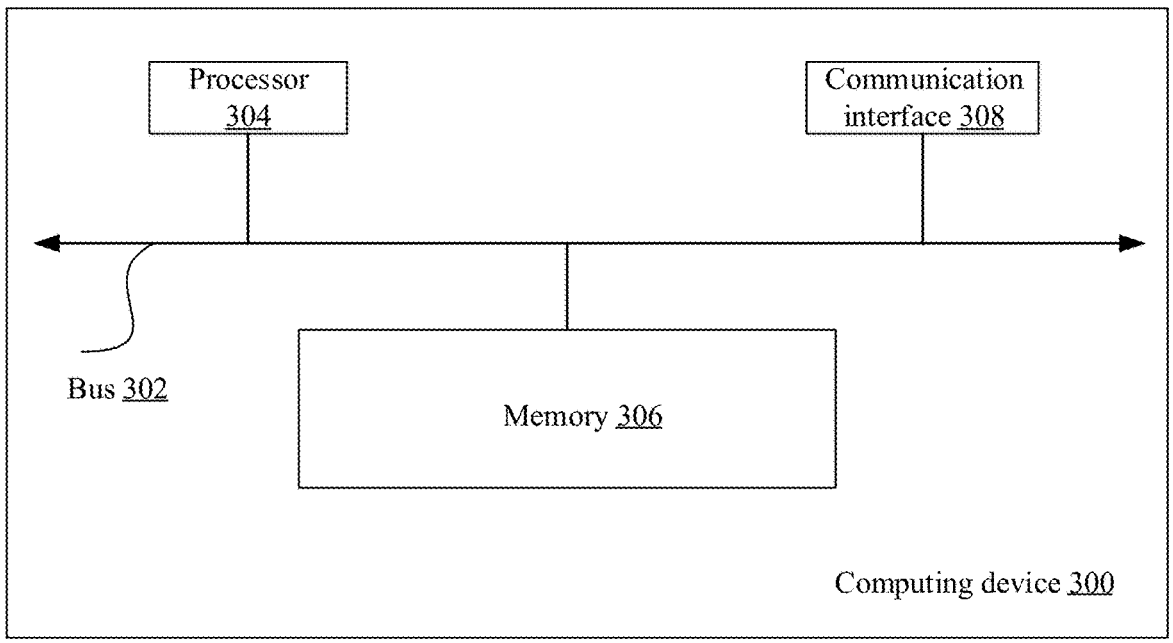
FIG. 3 is a schematic structural diagram of a computing device, in accordance with embodiments of the present disclosure.

FIG. 3 is a diagram illustrating a hardware structure of a computing device 300 provided in the embodiments of the present disclosure. As shown in FIG. 3, the computing device 300 includes a bus 302, a processor 303, a memory 306 and a communication interface 308. The processor 303, the memory 306 and the communication interface 308 communicate with each other via the bus 302. The computing device 300 may be a server or a terminal device. It can be understood that the number of processors and the number of memories in the computing device 300 are not limited in the present disclosure.

The bus 302 may be a peripheral component interconnect (PCI) bus or an extended industry standard architecture (EISA) bus. The bus may be classified into an address bus, data bus, control bus, etc. For convenient of representation, only one bold line is used to indicate the bus in FIG. 3, but it does not mean that there is only one bus or one type of bus. The bus 302 may include paths for transmitting information between all the components (e.g., the processor 306, the memory 303, and the communication interface 308) in the computing device 300.

The processor 303 may include any one or more of a central processing unit (CPU), a graphics processing unit (GPU), a microprocessor (MP), or a digital signal processor (DSP).

The memory 306 may include a volatile memory, such as random access memory (RAM). The memory 306 may also include a non-volatile memory, such as a read-only memory (ROM), a flash memory, a hard disk drive (HDD), or a solid state drive (SSD).

The memory 306 has stored executable program codes, and the processor 303 executes the executable program codes to implement the functions of the DBMS, thereby realizing the method of incorporating the BF into cost-based bottom-up query optimization. That is, the memory 306 has stored thereon instructions for executing the method of incorporating the BF into cost-based bottom-up query optimization.

The communication interface 308 uses a transceiver module such as, but not limited to, a network interface card or a transceiver, to implement communication between the computing device 300 and other devices or a communication network.

In some other embodiments, the query optimization device for executing the method of incorporating the BF into bottom-up query optimization provided in the embodiments of the present disclosure is a computer cluster. The computer cluster includes a plurality of computing devices. The plurality of computing devices are used to jointly perform instructions for the method of incorporating the BF into cost-based bottom-up query optimization.

The computing device may be a server, such as a central server, an edge server, or a local server in a local data center. In some embodiments, the computing device may also be a terminal device such as a desktop computer, a laptop computer, or a smart phone.

A hardware structure of any computing device in the computer cluster may be shown in FIG. 3.

In some possible implementations, the memories in the multiple computing devices in the computer cluster may store the same instructions for executing the method of incorporating the BF into cost-based bottom-up query optimization.

In some possible implementations, memories of the plurality of computing devices in the computer cluster may each store a part of the instructions for executing the method of incorporating the BF into cost-based bottom-up query optimization. For example, memories in different computing devices in the computer cluster may store different instructions for executing parts of functions of the DBMS. That is, the instructions stored in the memories of different computing devices can implement a function of one or more modules included in the DBMS.

In some possible implementations, the plurality of computing devices in the computer cluster are connected via a network. The network may be a wide area network or a local area network. For example, communication interfaces of all the computing devices are connected to the network.

Hereinafter, the method of incorporating the BF into cost-based bottom-up query optimization performed by the DBMS in the embodiments of the present disclosure will be described with reference to the accompanying drawings.

Figure 4:
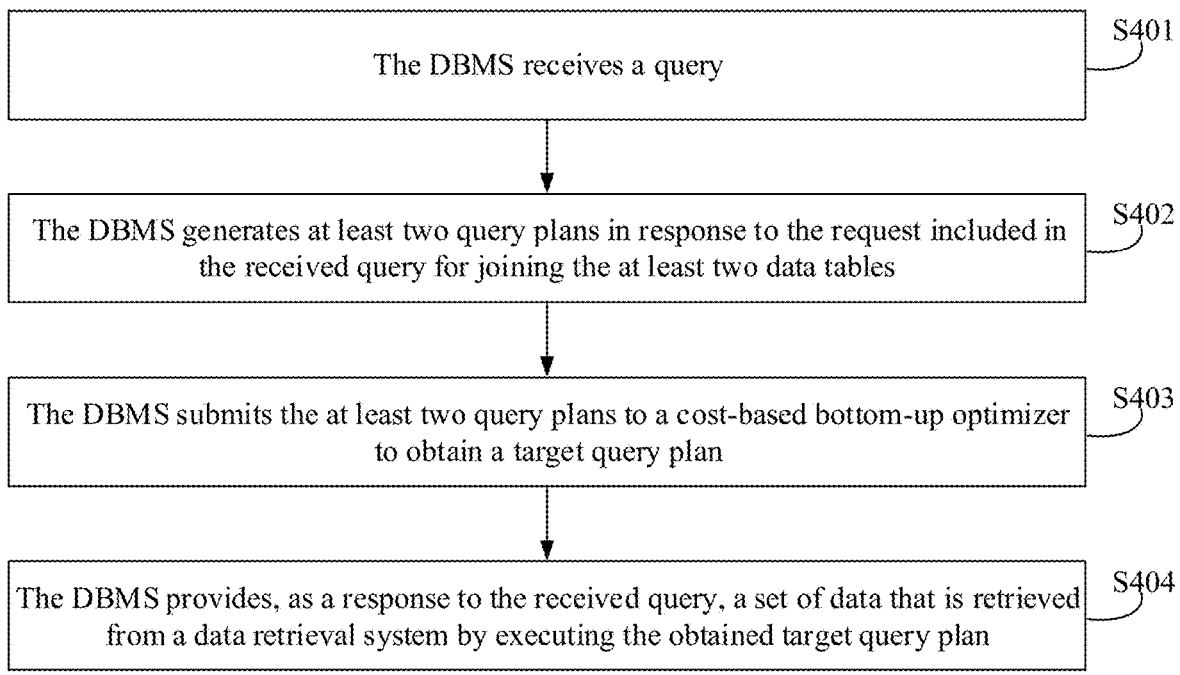
FIG. 4 is a flow chart of a method of incorporating a BF into cost-based bottom-up query optimization, in accordance with embodiments of the present disclosure.

As shown in FIG. 4, the method incorporating the BF into cost-based bottom-up query optimization provided in the embodiments of the present disclosure includes S401 to S404.

In S401, the DBMS receives a query. The query includes a request to join at least two data tables, and the at least two data tables include a first data table and a second data table.

For example, the first data table and the second data table may be any two data tables among the at least two data tables.

Optionally, the above query may be a query statement, such as a SQL statement.

For example, the query is:
SELECT*FROM t1, t2, t3, t4
   WHERE t1.c1=t3.c3 AND t1.c1=t4.c4 AND t1.c1=t2.c2 AND t2.c4=100

The query is used to obtain, from the data tables t1, t2, t3, and t4, records that meet the conditions: t1.c1=t2.c2, t1.c1=t3.c3, t1.c1=t4.c4, t2.c4=100.

Then, the DBMS determines that the at least two data tables include the data table t1, data table t2, data table t3, and data table t4. The first data table and the second data table are any two data tables among the data table t1, data table t2, data table t3, and data table t4.

It can be understood that one of the query conditions in the query is "t1.c1=t3.c3", which is used to indicate that there is a join relationship between the data table t1 and the data table t3. Other query conditions are not described here one by one.

In S402, the DBMS generates at least two query plans in response to the request included in the received query for joining the at least two data tables.

The at least two query plans include a first query plan. The first query plan includes the following subplans A to C.

In subplan A, the DBMS creates a BF based on the second data table.

It can be understood that in the first query plan, the second data table is a creating side of the BF.

In combination with the example in S501 above, assuming that the second data table is the data table t2, the DBMS may create the BF based on the column c2 in the data table t2.

In subplan B, the DBMS applies the created BF to the first data table for filtering data of the first data table before the first data table is joined with another data table.

It can be understood that the another data table is a data table (including the second data table) other than the first data table among the at least two data tables as mentioned above. In the first query plan, the DBMS needs to apply the BF created from the second data table to filter the data in the first data table before the first data table is joined with another data table. That is, in the first query plan, the first data table is an applying side of the BF.

In subplan C, the DBMS joins the first data table with the another data table.

For example, after joining the at least two data tables, the DBMS obtains the first query plan.

In the embodiments of the present disclosure, the first query plan may be any one of the at least two query plans that includes a BF. The another query plan of the at least two query plans may be a query plan including a BF, or may be a query plan including no BF.

In S403, the DBMS submits the at least two query plans to a cost-based bottom-up optimizer to obtain a target query plan.

It can be understood that the target query plan is the optimal query plan among the at least two query plans, and the target query plan includes the creating side of the BF and the applying side of the BF.

In some embodiments, the above S403, that is, submitting, by the DBMS, the at least two query plans to the cost-based bottom-up optimizer to obtain the target query plan may include the following S4031 to S4032.

In S4031, the DBMS submits the at least two query plans to the cost-based bottom-up optimizer to obtain costs of the at least two query plans.

A cost of the first query plan in the at least two query plans includes a cost of building the BF and a cost of applying the BF.

Optionally, the cost of the first query plan also includes a cost of a scan plan included in the first query plan and a cost of a join plan included in the first query plan.

In S4032, the DBMS determines the target query plan based on the costs of the at least two query plans.

For example, based on the costs of the at least two query plans, the DBMS selects, from the at least two query plans, a query plan whose cost satisfies the condition as the target query plan.

In some examples, the DBMS determines a query plan with the lowest cost among the at least two query plans as the target query plan.

In some other examples, the DBMS determines a query plan with a cost less than a certain threshold among the at least two query plans as the target query plan.

The cost of the first query plan includes the cost of creating the BF and the cost of applying the BF, that is, the DBMS considers the cost of creating the BF and the cost of applying the BF in the process of determining the target query plan. Therefore, it can more accurately determine (or select) the optimal query plan from the at least two query plans.

In S404, the DBMS provides, as a response to the received query, a set of data that is retrieved from a data retrieval system by executing the obtained target query plan.

For example, after executing the target query plan, the DBMS may retrieve (or obtain) a set of data from the data retrieval system based on each condition included in the above query, and then respond to/return the set of data.

Optionally, the data retrieval system in the embodiments of the present disclosure includes, but is not limited to, a database, data lake, data virtualization, and distributed and federated database.

In the method of incorporating the BF into cost-based bottom-up query optimization by the DBMS provided in the embodiments of the present disclosure, the DBMS receives a query that includes a request to join at least two data tables (including a first data table and a second data table), and generates at least two query plans in response to the request. Then, the DBMS submits the at least two query plans to a cost-based bottom-up optimizer to obtain a target query plan, and performs a query operation based on the target query plan. In the process of generating a query plan among the at least two query plans, the BF is introduced. For example, there are subplans to create a BF based on the second data table, and apply the created BF to the first data table for filtering data of the first data table before the first data table is joined with another data table. That is to say, the method introduces the BF in the process of generating the at least two query plans, so that the cost of the BF can be considered when selecting the target query plan from the at least two query plans, which is conducive to improving the optimality of selecting the optimal query plan from the at least two query plans.

Figure 5:
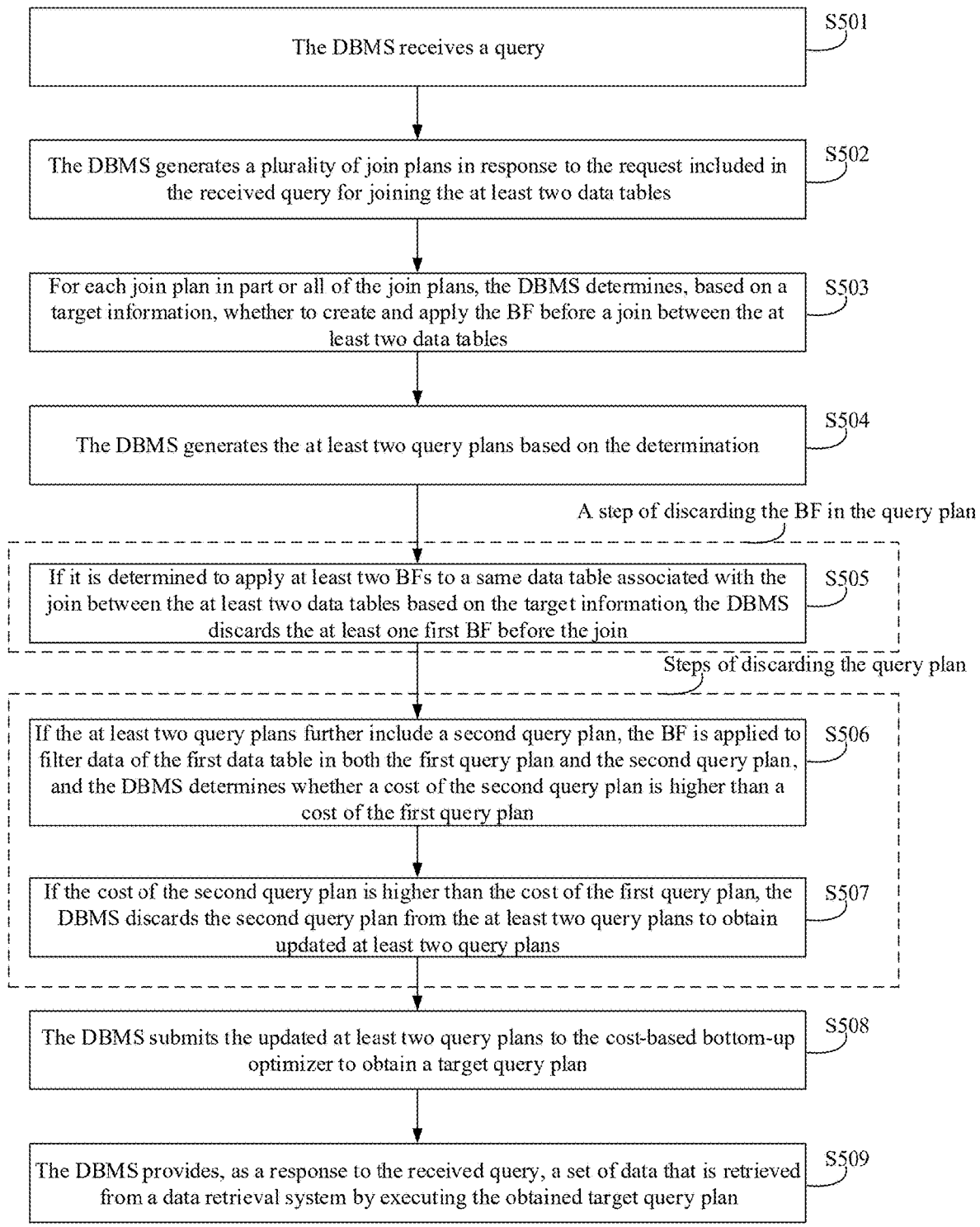
FIG. 5 is a flow chart of another method of incorporating a BF into cost-based bottom-up query optimization, in accordance with embodiments of the present disclosure.

The method shown in FIG. 4 is described in detail below with reference to FIG. 5. As shown in FIG. 5, the method incorporating the BF into cost-based bottom-up query optimization performed by the DBMS in the embodiments of the present disclosure includes S501 to S509.

In S501, the DBMS receives a query. The query includes a request to join at least two data tables, and the at least two data tables include a first data table and a second data table.

It should be noted that the explanation of S501 is the same or similar to the description of the above S401, reference can be made to the above description of S401, and details will not be repeated here.

In S502, the DBMS generates a plurality of join plans in response to the request included in the received query for joining the at least two data tables. A join plan includes one or more joins.

It can be understood that, any one of the plurality of join plans may indicate a join order and join method between at least two data tables. The join order between the at least two data tables included in different join plans may be different, and the join method between the at least two data tables included in different join plans may also be different.

For any join plan, the DBMS can generate one or more scan plans. The scan methods of data tables in different scan plans may be the same or different.

For each join plan in part or all of the join plans, the DBMS may determine whether to apply a BF before each join in part or all of the joins based on some information or rules, thus generating at least two query plans. As for details, reference can be made to the following S503 and S504. The following S503 and S504 may be referred to as a process of determining whether to apply the BF.

In S503, for each join plan in part or all of the join plans, the DBMS determines, based on a target information, whether to create and apply the created BF before a join between the at least two data tables.

The target information is used to indicate the filtering effect of the created BF. Optionally, the target information includes at least one of: a semantic information of the join, a filtering capacity represented by a join predicate corresponding to the join, or a data amount of a data table associated with the join.

It can be understood that the join between the at least two data tables mentioned above is any join included in any join plan for the at least two data tables.

For example, the semantic information of the join may indicate a field (or column) of the data table associated with the join. For example, the semantic information of the join may indicate the join between the primary key of the data table on the creating side of the BF and the foreign key of the data table on the applying side of the BF. Based on the semantic information of the join included in the target information, the matching relationship between the data tables associated with the join can be determined. The matching relationship can affect the filtering effect of the BF. For example, if the data tables associated with the join match successfully, it means that each row of data in a certain column in a data table corresponds to a data value in another data table. If no data can be filtered out when the BF is applied, then the filtering effect is poor. Therefore, the DBMS can determine whether to create and apply the BF before the join based on the semantic information of the join.

The filtering capability represented by the join predicate corresponding to the join is used to indicate the amount of data that can be filtered by the join predicate. The data amount of the data table associated with the join may be understood as the number of entries included in the data table associated with the join or the size of the data table associated with the join. The filtering capability represented by the join predicate corresponding to the join or the data amount of the data table associated with the join may affect the effect of creating and applying the BF to perform data filtering on the data table associated with the join. Therefore, the DBMS may determine whether to create and apply the BF before the join based on at least one of: the filtering capability represented by the join predicate corresponding to the join and the data amount of the data table associated with the join.

For example, as for several implementations involved in S503, reference is made to the following description.

In S504, the DBMS generates the at least two query plans based on the determination. The at least two query plans include a first query plan. If the DBMS determines to apply the created BF before the join in S503, then the query plan generated based on the determination is the first query plan.

When a BF is applied before one or more joins in a join plan, the query plan generated by the DBMS may be used as the first query plan, that is, the query plan includes the BF.

For any join plan, if the DBMS determines not to apply the BF before each join, the query plan obtained by the DBMS based on the join plan is a query plan that includes no BF.

It can be understood that the above S503 and S504 is an implementation of the DBMS generating at least two query plans in the above S402.

Figure 6:
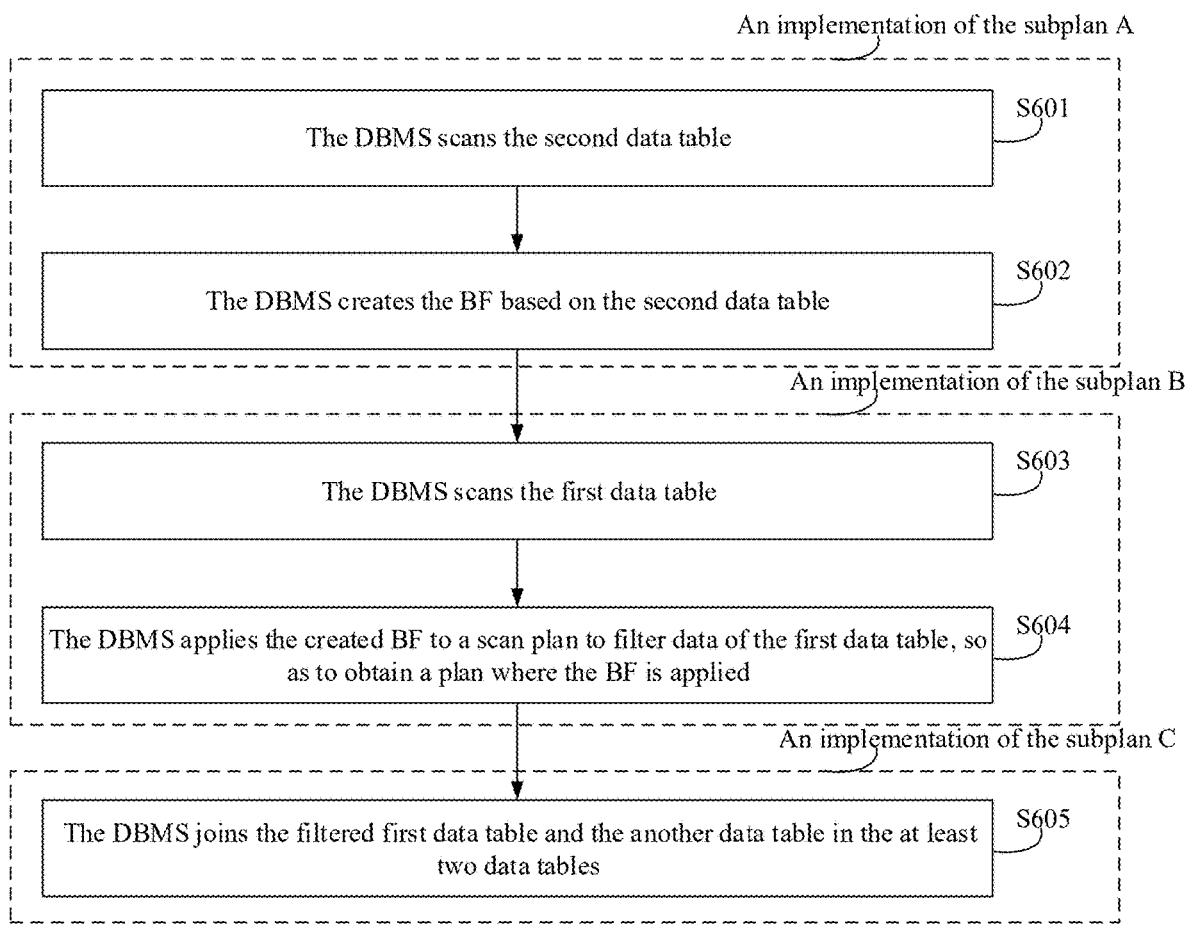
FIG. 6 is a flow chart of a process of generating a first query plan by a DBMS, in accordance with embodiments of the present disclosure.

For example, as for details of the process of the DBMS generating the first query plan in S504, reference is made to the following manner with reference to FIG. 6.

In S505, if it is determined to apply at least two BFs to a same data table associated with the join between the at least two data tables based on the target information, the DBMS discards the at least one first BF before the join. The at least two BFs include at least one first BF and at least one second BF, and a filtering capacity of the at least one first BF is lower than a filtering capacity of the at least one second BF.

If it is determined that at least two BFs are applied to the same data table, the DBMS may discard a BF with a lower filtering capability (i.e., the at least one first BF) and retain a BF with a higher filtering capability (i.e., the at least one second BF). In this way, it helps to ensure that the query plan has a certain filtering effect while reducing the cost increased by applying the BF with poor filtering capability.

It will be understood that the above step S505 is optional, which can be considered as the step of discarding the BF in the query plan.

In S506, if the at least two query plans further include a second query plan, the BF is applied to filter data of the first data table in both the first query plan and the second query plan, and the DBMS determines whether a cost of the second query plan is higher than a cost of the first query plan.

It can be understood that the second query plan is a query plan including the BF in the another query plan in the above embodiments. Both the second query plan and the first query plan use the same BF to filter the data of the first data table.

It can be understood that the scan method of the data table included in the second query plan may be the same as or different from the scan method of the data table included in the first query plan, and the join method (or join order) corresponding to at least two data tables included in the second query plan may be the same as or different from the join method (or join order) corresponding to at least two data tables included in the first query plan.

In S507, if the cost of the second query plan is higher than the cost of the first query plan, the DBMS discards the second query plan from the at least two query plans to obtain updated at least two query plans.

It will be understood that the above steps S506 and S507 are optional, which can be considered as the steps of discarding the query plan.

The above S506 and S507 can also be understood as a process of pruning the second query plan. For the plurality of query plans that join the same data tables and use the same BF to filter data in the same data table, the DBMS can pre-prune (or pre-discard) a query plan with higher cost and retain a query plan with lower cost, thereby reducing the search space of the optimizer and improving the filtering efficiency of the target query plan.

In S508, the DBMS submits the updated at least two query plans to the cost-based bottom-up optimizer to obtain a target query plan.

It can be understood that if the DBMS does not execute the above S506 and S507, then the "updated at least two query plans" in S508 should be replaced with the above "at least two query plans".

In addition, if the DBMS has executed S506 and S507, the "at least two query plans" in the above S4031 and S4032 should be replaced with the "updated at least two query plans".

In S509, the DBMS provides, as a response to the received query, a set of data that is retrieved from a data retrieval system by executing the obtained target query plan.

It should be noted that the explanation of S509 is the same or similar to the description of the above S404, reference can be made to the above description of S404, and details will not be repeated here.

The implementations of the above S503 will be described in detail below.

In a first implementation, the target information includes the semantic information of the join, and the join is used to join a data table on the creating side of the BF with a data table on the applying side of the BF out of the at least two data tables. In this case, if the semantic information indicates that a primary key of the data table on the creating side of the BF is joined with a foreign key of the data table on the applying side of the BF and no filter predicate exists in the data table on the creating side of the BF, the BF is not created from the data table on the creating side of the BF and is not applied to the data table on the applying side of the BF before the join.

It can be understood that, if the semantic information indicates that the primary key of the data table on the creating side of the BF is joined with the foreign key of the data table on the applying side of the BF and there is no filter predicate in the data table on the creating side of the BF, it means that the data table on the creating side of the BF and the data table on the applying side of the BF are successfully matched. For example, for each row of data in the foreign key of the data table on the applying side of the BF, there is a corresponding data value in the primary key of the data table on the creating side of the BF, which means that the join will not filter out any data, so that it is meaningless to apply the BF to the data table on the applying side of the BF at this time. Therefore, the BF is not created from the data table on the creating side of the BF and is not applied to the data table on the applying side of the BF before the join. Optionally, the filter predicate may include a local predicate and a join predicate.

In a second implementation, the above target information includes the semantic information of the join and the filtering capacity represented by the join predicate corresponding to the join, and the join is used to join the data table on the creating side of the BF with the data table on the applying side of the BF out of the at least two data tables. In this case, if at least one case of the following conditions cases, if the filtering capacity represented by the join predicate corresponding to the join is greater than a capacity threshold, the created BF is applied to the data table on the applying side of the BF before the join.

For example, at least one case in the second implementation includes that:

1) the semantic information indicates that the primary key of the data table on the creating side of the BF is joined with a field other than the foreign key in the data table on the applying side of the BF;
2) the semantic information indicates that a field other than the primary key of the data table on the creating side of the BF is joined with the foreign key of the data table on the applying side of the BF;
3) the semantic information indicates that the field other than the primary key of the data table on the creating side of the BF is joined with the field other than the foreign key of the data table on the applying side of the BF;
4) the semantic information indicates that at least one of the primary key of the data table on the creating side of the BF or the foreign key of the data table on the applying side of the BF does not exists; or
5) a filter predicate exists in the data table on the creating side of the BF.

It can be understood that, if at least one case of the above cases in the second implementation exists, it means that some of the rows in the data table on the creating side of the BF fails to match the data table on the applying side of the BF; it may also be understood that some data in the data table on the applying side of the BF does not have a corresponding data value in the data table on the creating side of the BF, that is, the join (or the join predicate corresponding to the join) can filter out some data in the data table on the applying side of the BF. In this case, the DBMS may determine whether the filtering capacity represented by the join predicate corresponding to the join is greater than the capacity threshold. If the filtering capacity represented by the join predicate is greater than the capacity threshold, it means that the join predicate can filter out a large amount of data or data records in the data table of the applying side of the BF. In this case, the DBMS determines to apply the created BF to the data table on the applying side of the BF before the join. That is, the DBMS can apply the BF when the join predicate corresponding to the join can filter a large amount of data, thereby filtering the data in the data table on the applying side of the BF based on the created BF, which can improve the effectiveness of the subsequent join or other operators.

Moreover, if there is another case that can indicate that the data table on the creating side of the BF does not match some of the rows in the data table on the applying side of the BF, then in this case, when the filtering capacity represented by the join predicate corresponding to the join is greater than the capacity threshold, it means that the join predicate can filter out a large amount of data or data records in the data table on the applying side of the BF. The DBMS may apply the created BF at the data table on the applying side of the BF before the join.

In addition, in any of the above cases that can indicate that the data table on the creating side of the BF does not match some of the rows in the data table on the applying side of the BF, the DBMS may also apply the created BF to the data table on the applying side of the BF before the join. There is no need to limit the relationship between the filtering capacity represented by the join predicate corresponding to the join and the capacity threshold.

Optionally, if at least one case of the cases in the second implementation exists and the filtering capacity represented by the join predicate corresponding to the join is less than or equal to the capacity threshold, the DBMS neither creates nor applies the BF before the join.

In a third implementation, the target information includes the semantic information of the join and the data amount of the data table associated with the join, the join is used to join two data tables out of the at least two data tables, and the two data tables include the data table on the creating side of the BF and the data table on the applying side of the BF. In this case, if at least one case of the following cases exists, the created BF is applied to a data table having a larger data amount in the two data tables before the join.

For example, at least one case in the third implementation includes that:
1) the semantic information indicates that a primary key of the data table on the creating side of the BF is joined with a field other than a foreign key of the data table on the applying side of the BF;
2) the semantic information indicates that a field other than the primary key of the data table on the creating side of the BF is joined with the foreign key of the data table on the applying side of the BF;
3) the semantic information indicates that the field other than the primary key of the data table on the creating side of the BF is joined with the field other than the foreign key of the data table on the applying side of the BF;
4) the semantic information indicates that at least one of the primary key of the data table on the creating side of the BF or the foreign key of the data table on the applying side of the BF does not exists; or
5) a filter predicate exists in the data table on the creating side of the BF.

It can be understood that if at least one case of the cases in the third implementation mentioned above exists, it means that some of the rows in the data table on the creating side of the BF fails to match the data table on the applying side of the BF. It can also be understood that, some data in the data table on the applying side of the BF does not correspond to data in the data table on the creating side of the BF. That is, the join (or the join predicate corresponding to the join) can filter out some data in the data table on the applying side of the BF. In this case, the DBMS can determine the amount of data in each data table of at least two data tables associated with the join, e.g., determine the amount of data that can be filtered based on the BF when the BF is applied to each data table. The larger the amount of data in the data table, the larger the amount of data that can be filtered when the BF is applied to the data table. That is, before the join, the DBMS can apply the created BF to the data table with larger data amount among the at least two data tables, so as to reduce the number of subplans during the bottom-up query optimization, leading to smaller search space and faster query optimization.

It can be understood that the data table with a larger amount of data among the at least two data tables is the data table on the applying side of the BF.

Optionally, if at least one case of the cases in the third implementation exists, the DBMS may not apply the created BF to the data table with a smaller amount of data among the at least two data tables before the join.

In the embodiments of the present disclosure, the DBMS may also determine whether to apply the created BF before the join based on other implementations. In other implementations, the target information may be a combination of one or more of the semantic information of the join, the filtering capacity represented by the join predicate corresponding to the join, and the data amount of the data table associated with the join.

In some embodiments, for a join plan in S503 above (i.e., the join plan for the at least two data tables), if it is determined that the BF is applied before the first data table participates in the join and the BF is created based on the second data table, then the process of generating, by the DBMS, the query plan (i.e., the first query plan) based on the join plan is shown in FIG. 6.

As shown in FIG. 6, the method may include the following steps.

In S601, the DBMS scans the second data table.

For example, the DBMS may scan, based on the scan plan, each data table of the at least two data tables (including the second data table).

Scanning the second data table can be understood as obtaining data in the second data table stored in the data retrieval system. The embodiments of the present disclosure do not limit the implementation of scanning the second data table. For example, the second data table may be scanned in a sequential scan or index scan method.

In S602, the DBMS creates the BF based on the second data table.

Creating the BF based on the second data table can be understood as creating the BF based on the scanned data in the second data table.

The above S601 and S602 may be the operations included in the subplan for creating the BF by the DBMS, i.e., an implementation of the above subplan A.

In S603, the DBMS scans the first data table.

The embodiments of the present disclosure do not limit the implementation of scanning the first data table. For example, the first data table may be scanned in a sequential scan or index scan method.

In S604, the DBMS applies the created BF to a scan plan to filter data of the first data table, so as to obtain a plan where the BF is applied.

In combination with the description of the above embodiments, it can be understood that the scan plan is a scan plan corresponding to the at least two data tables, and the scan plan includes a scan method of each data table among the at least two data tables.

In the embodiments of the present disclosure, applying the created BF to the scan plan to filter the data in the first data table is to filter the data in the first data table based on the created BF.

The above S603 and S604 may be operations included in the subplan of applying the created BF to the first data table by the DBMS, i.e., an implementation of the above subplan B.

In S605, the DBMS joins the filtered first data table and the another data table in the at least two data tables.

It can be understood that after the DBMS joins the filtered first data table and the another data table, the above-mentioned first query plan is obtained.

The above S605 may be operations included in the subplan of joining the first data table with the another data table by the DBMS, i.e., an implementation of the above subplan C.

In the embodiments of the present disclosure, the subplan A is used to create the BF, the subplan B is used to apply the BF, and the subplan C is used to join the subplan A and the subplan B. Thus, the BF is resolved in the subplan C. That is, the subplan B requires the BF, and the subplan A delivers the BF, so that the request from the BF by the subplan B is resolved in the subplan C.

Optionally, a plan obtained based on the subplans A and B is a query plan to be resolved, and a plan obtained based on the subplan C is a resolved query plan.

Figure 7:
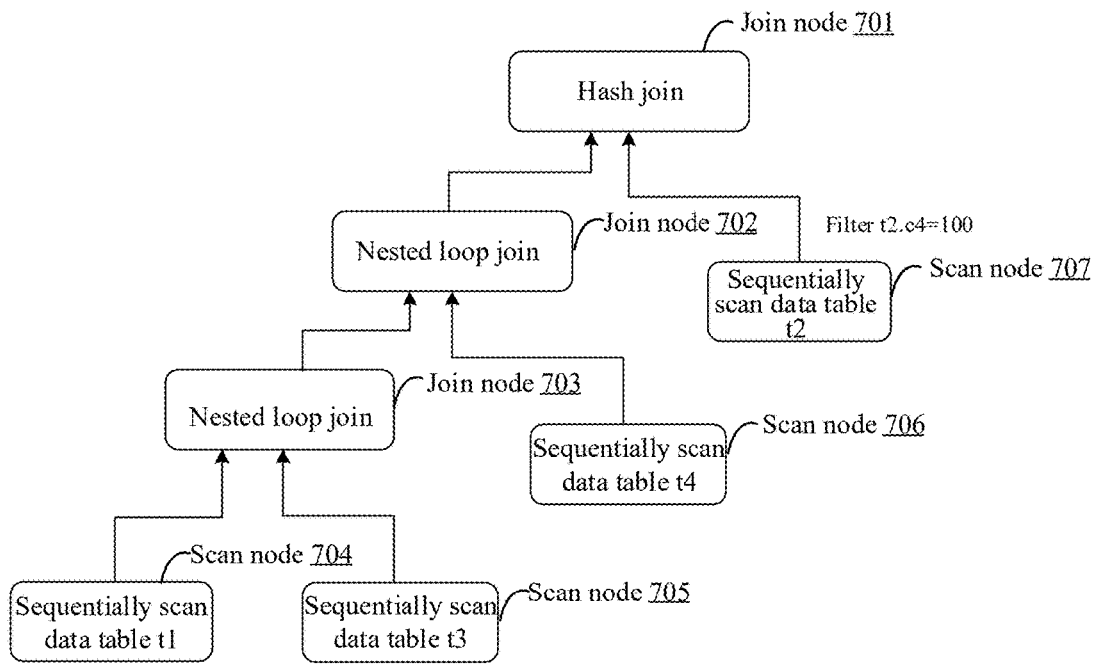
FIG. 7 is a schematic structural diagram of a query plan, in accordance with embodiments of the present disclosure.

For example, with reference to the SQL statement in S401 as mentioned above, a tree structure of a query plan based on the SQL statement may be as shown in FIG. 7. The query plan includes: a join node 701, a join node 702, a join node 703, a scan node 704, a scan node 705, a scan node 706, and a scan node 707. The join node 701 joins the scan node 707 and the join node 702, the join node 702 joins the scan node 706 and the join node 703, and the join node 703 joins the scan node 704 and the scan node 705.

The scan node 704, scan node 707, scan node 705, and scan node 706 are used to scan the data table t1, data table t2, data table t3, and data table t4, respectively. The data table t1, data table t2, data table t3 and data table t4 are all scanned using a sequential scan method.

The join represented by the join node 703 is used to join the data table t1 and the data table t3. The join represented by the join node 702 is used to join the data table t1 and the data table t4. The join represented by the join node 701 is used to join the data table t1 and the data table t2. The join represented by join node 701 is a hash join. The joins represented by join nodes 702 and 703 are nested loop joins.

In addition, Filter t2.c4=100 shown in FIG. 7 is a query condition in the SQL statement mentioned in S401, and is used to obtain data satisfying the query condition.

Figure 8:
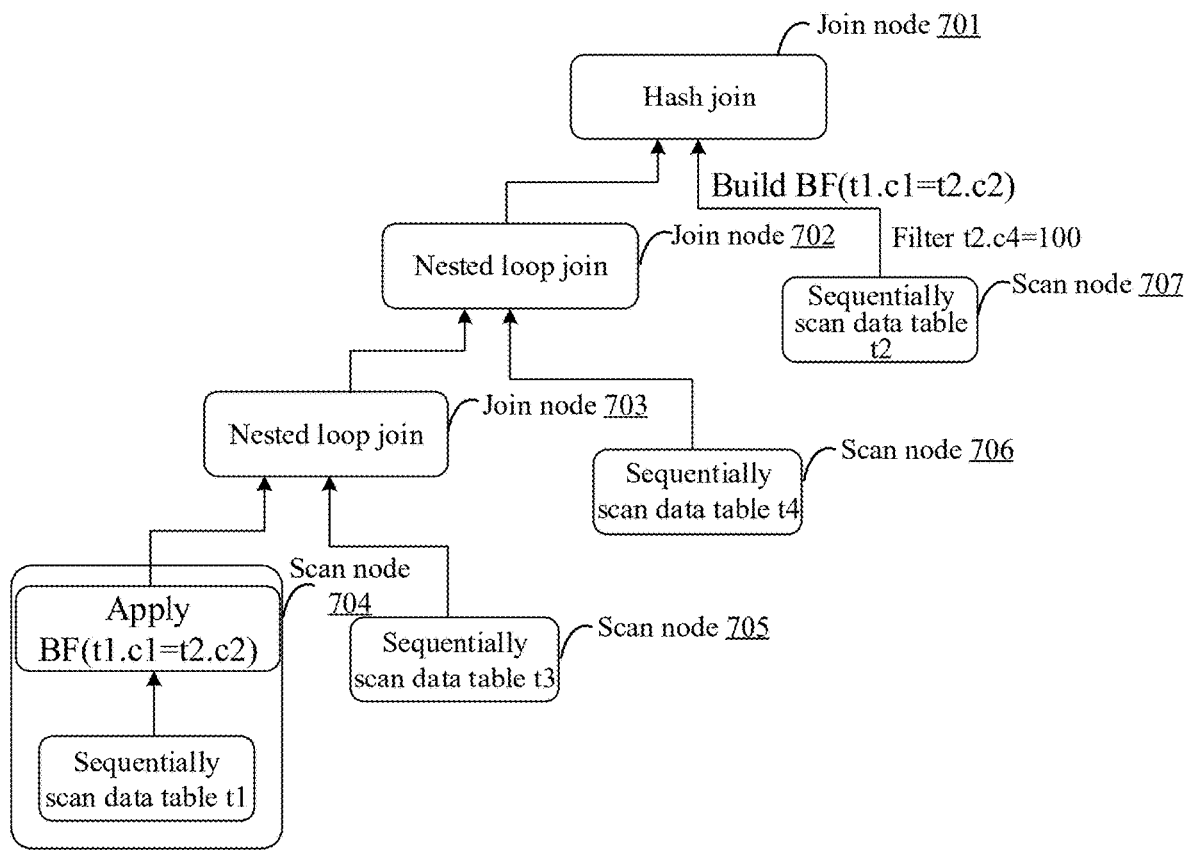
FIG. 8 is a schematic structural diagram of a first query plan, in accordance with embodiments of the present disclosure.

The DBMS creates a BF using the c2 column in the data table t2, and applies the created BF to the data table t1, so as to a tree structure as shown in FIG. 8. The query plan corresponding to the tree structure shown in FIG. 8 is the first query plan provided in the above embodiments.

It can be understood that in the query plan corresponding to the tree structure shown in FIG. 8, the DBMS can use the c2 column in the data table t2 to create the BF and apply the created BF to the scan plan, and then filter the data in the data table t1 to obtain the plan where the BF is applied. Next, after the filtered data table t1 is joined with the data tables t3, t4 and t2, the DBMS obtains the first query plan.

Optionally, the DBMS may determine a status of the query plan to be resolved by the created BF to a to-be-resolved status, where the to-be-resolved status is used to indicate that the query plan is a query plan to be resolved by the created BF. Furthermore, the DBMS may also determine the status of the resolved query plan to a resolved status, where the resolved status is used to indicate that the query plan is a query plan that has been resolved by the created BF.

It can be understood that if the status of the query plan is the to-be-resolved status, it means that the query plan is a query plan to be resolved by the created BF. It can also be understood that the query plan to be resolved by the created BF is not a query plan that has been created (or a complete query plan). Therefore, the query plan to be resolved by the created BF cannot be discarded during the cost selecting process (e.g., selecting the optimal query plan). That is to say, the DBMS can directly determine whether the query plan has been created based on the status of the query plan, without having to determine whether the BF has been applied in the query plan, so as to simply and efficiently identify the completeness of the query plan.

In the embodiments of the present disclosure, for the at least two data tables included in the query, the DBMS can scan one data table and use the one data table to create a BF, and apply the created BF to the another data table. The plan to be resolved by the created BF is not a complete query plan, and it cannot be discarded during the cost selecting process (e.g., selecting the optimal query plan). Then, the DBMS needs to join the first data table with the another data table, so as to obtain the complete query plan. For example, the complete query plan is the first query plan including the creating side of the BF and the applying side of the BF. That is to say, the DBMS can obtain the complete query plan and submit it to the cost-based bottom-up optimizer, thus realizing the process of selecting the optimal query plan.

In the related art, there is a problem of high resource consumption in the process of executing the optimal query plan, for example, the DBMS needs to create a hash table with a large number of rows on the creating side of the hash join.

For example, in the optimal query plan with the BF added shown in FIG. 2, during the process of creating the join represented by the join node 102 (e.g., a hash join), since the data table t2 is the creating side of the hash table corresponding to the hash join, the DBMS needs to create a 100 M entry hash table from the data table t2.

In an implementation in the embodiments of the present disclosure, among the above at least two query plans, the DBMS may use the data table on the applying side of the BF as the creating side of the hash table, thereby significantly reducing the number of rows of the hash table that needs to be created.

Figure 9:
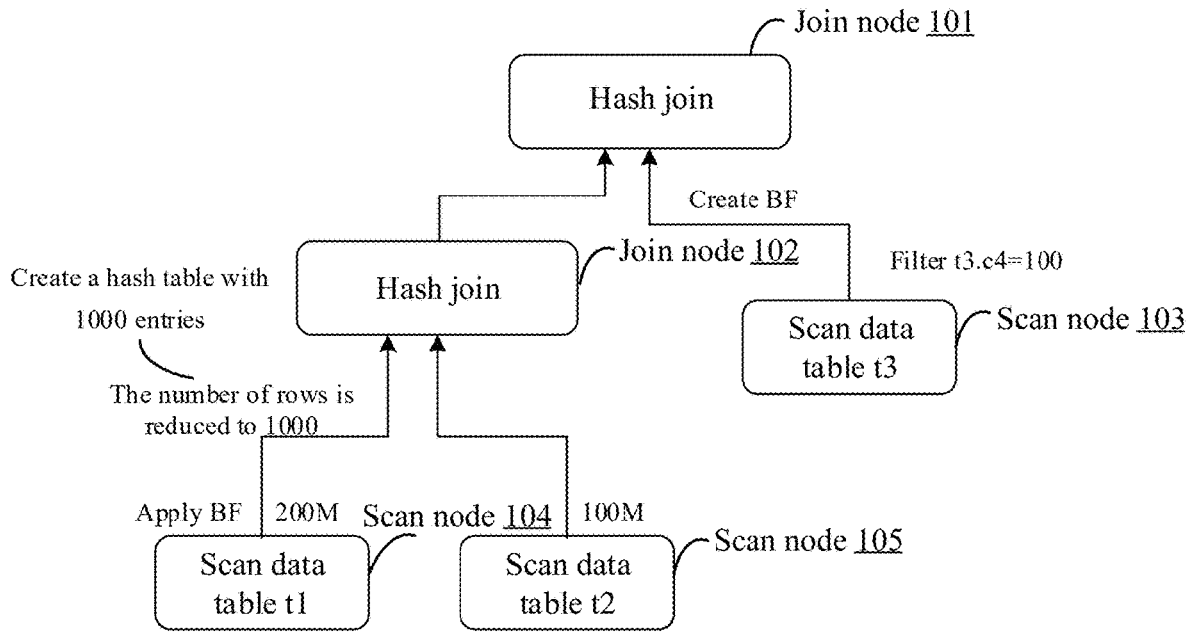
FIG. 9 is a schematic structural diagram of a query plan in which a BF is applied to a data table on a creating side of a hash table, in accordance with embodiments of the present disclosure.

For example, with reference to FIG. 2, in the tree structure shown in FIG. 9, since applying the BF to the data table t1 may reduce the number of rows in the data table t1 to 1000 entries, the DBMS may use the data table t1 (i.e., the applying side of the BF) as the creating side of the hash table. In this case, only a hash table with 1000 entries needs to be created from the data table t1.

In another implementation in the embodiments of the present disclosure, among the plurality of joins included in the above-mentioned at least two query plans, if any join is a hash join, the DBMS will update the hash join to a nested loop join and use an external table of the nested loop join as the applying side of the BF, thereby significantly reducing resource consumption during the execution of the query plan.

Figure 10:
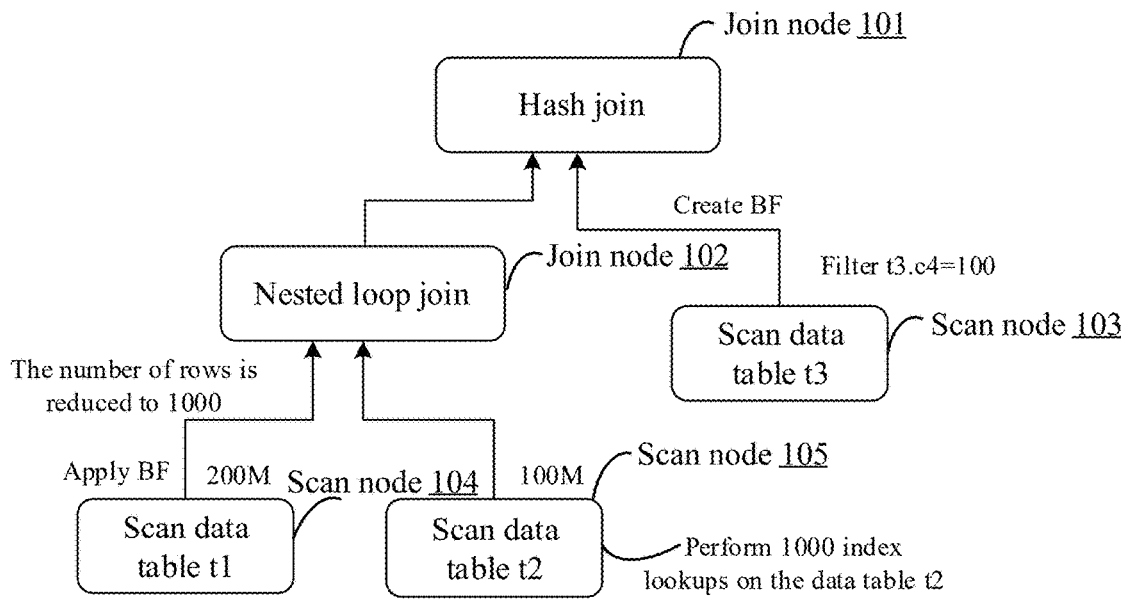
FIG. 10 is a schematic structural diagram of a query plan in which a BF is applied to an external table of a nested loop join, in accordance with embodiments of the present disclosure.

For example, with reference to FIG. 2, in the tree structure shown in FIG. 10, since the external table of the join represented by the join node 102 (e.g., a nested loop join) is the data table t1, and the DBMS applies the BF to the data table t1, the number of rows in data table t1 may be reduced to 1000 entries. That is, the data table t1 is the applying side of the BF. Therefore, the DBMS only needs to perform 1000 index lookups in the data table t2, without having to create a 100 M entry hash table in the data table t1.

Some embodiments of the present disclosure provide a computer-readable storage medium (for example, a non-transitory computer-readable storage medium), the computer-readable storage medium has stored computer program instructions, and the computer program instructions, when executed by a computing device, cause the computing device to perform one or more of steps in the method of incorporating the BF into cost-based bottom-up query optimization as described in any one of the above embodiments.

For example, the computer-readable storage medium may include, but is not limited to, a magnetic storage device (e.g., a hard disk, a floppy disk or a magnetic tape), an optical disk (e.g., a compact disk (CD) or a digital versatile disk (DVD)), a smart card and a flash memory device (e.g., an erasable programmable read-only memory (EPROM), a card, a stick or a key driver). Various computer-readable storage media described in the embodiments of the present disclosure may represent one or more devices and/or other machine-readable storage media, which are used for storing information.

The term "machine-readable storage medium" may include, but is not limited to, wireless channels and various other media capable of storing, containing, and/or carrying instructions and/or data.

Some embodiments of the present disclosure provide a computer program product. The computer program product includes computer program instructions carried on a non-transitory computer-readable storage medium. When the computer program instructions are executed on a computing device, the computer program instructions cause the computing device to perform one or more of steps in the method of incorporating the BF into cost-based bottom-up query optimization as described in any one of the above embodiments.

Beneficial effects of the computer-readable storage medium and the computer program product are the same as beneficial effects of the method of incorporating the BF into cost-based bottom-up query optimization by the DBMS as described in the above embodiments, which will not be repeated here.

The foregoing descriptions are merely specific implementations of the present disclosure, but the protection scope of the present disclosure is not limited thereto. Any changes or replacements within the technical scope of the present disclosure shall be included in the protection scope of the present disclosure. Therefore, the protection scope of the present disclosure shall be subject to the protection scope of the claims.

What is claimed is:

1. A method of incorporating a bloom filter (BF) into cost-based bottom-up query optimization, performed by a database management system (DBMS), the method comprising:

receiving a query that includes a request to join at least two data tables, the at least two data tables including a first data table and a second data table;

determining whether to create one or more additional subplans for scan of the first data table that include application of the BF based on the second data table, based on a target information, wherein the target information includes semantic information of a join predicate between the at least two data tables, and wherein the target information further includes at least one of a filtering capacity represented by the join predicate corresponding to the join or a data amount of a data table associated with the join;

after the determining, generating one or more additional BF subplans for the scan of the first data table, wherein each BF subplan includes directives to:

create the BF based on the second data table; and apply the BF to the first data table for filtering data of the first data table before the first data table is joined with another data table, wherein each BF subplan includes a revised estimate of a number of rows and a cost for applying the BF such that the scan of the first data table includes at least two subplans, the at least two subplans include a BF subplan that includes the application of the BF, and a non-BF subplan that includes no BF;

submitting the at least two subplans to a cost-based bottom-up optimizer to obtain a target query plan, wherein the cost-based bottom-up optimizer considers the revised estimate of the number of rows and cost of the one or more additional BF subplans in comparison to non-BF subplans and arrive at the target query plan with a different join order, join method, or other operations had the BF subplan not been included; and providing, as a response to the query, a set of data that is retrieved from a data retrieval system by executing the target query plan.

2. The method of claim 1, wherein a first subplan of creating the BF includes operations to: for a join of the at least two data tables,
scan the second data table; and
create the BF based on the second data table;

a second subplan of applying the BF to the first data table includes operations to:
scan the first data table; and
apply the BF to a scan plan to filter data of the first data table, so as to obtain a plan where the BF is applied; and a third subplan of joining the first data table with the another data table includes operations to:
join the filtered first data table and the another data table in the at least two data tables.

3. The method of claim 1, wherein the submitting the at least two subplans to the cost-based bottom-up optimizer to obtain the target query plan, includes:

submitting the at least two subplans to the cost-based bottom-up optimizer to obtain costs of at least two query plans, wherein a cost of a first query plan in the at least two query plans includes a cost of building the BF and a cost of applying the BF; and determining the target query plan based on the costs of the at least two query plans.

4. The method of claim 1, wherein the join is used to join a data table on a creating side of the BF with a data table on an applying side of the BF out of the at least two data tables, and wherein the determining whether to create and apply the BF before the join based on the target information includes:

determining not to create the BF based on the data table on the creating side of the BF and not to apply the BF to the data table on the applying side of the BF before the join, in a case where the semantic information indicates that a primary key of the data table on the creating side of the BF is joined with a foreign key of the data table on the applying side of the BF and no filter predicate exists in the data table on the creating side of the BF.

5. The method of claim 1, wherein the filtering capacity represented by the join predicate corresponding to the join, and the join is used to join a data table on a creating side of the BF with a data table on an applying side of the BF out of the at least two data tables, and wherein the determining whether to create and apply the BF before the join based on the target information includes:

determining to create the BF based on the data table on the creating side of the BF and apply the BF to the data table on the applying side of the BF before the join if the filtering capacity represented by the join predicate corresponding to the join is greater than a capacity threshold in at least one case where:

the semantic information indicates that a primary key of the data table on the creating side of the BF is joined with a field other than a foreign key of the data table on the applying side of the BF, the semantic information indicates that a field other than the primary key of the data table on the creating side of the BF is joined with the foreign key of the data table on the applying side of the BF, the semantic information indicates that the field other than the primary key of the data table on the creating side of the BF is joined with the field other than the foreign key of the data table on the applying side of the BF, the semantic information indicates that at least one of the primary key of the data table on the creating side of the BF or the foreign key of the data table on the applying side of the BF does not exists, or a filter predicate exists in the data table on the creating side of the BF.

6. The method of claim 1, wherein the data amount of the data table associated with the join, and the join is used to join two data tables out of the at least two data tables, wherein the two data tables include the data table on a creating side of the BF and the data table on an applying side of the BF, and wherein the determining whether to create and apply the BF before the join based on the target information includes:

determining to apply the BF to a data table having a larger data amount in the two data tables before the join in at least one case where:

the semantic information indicates that a primary key of the data table on the creating side of the BF is joined with a field other than a foreign key of the data table on the applying side of the BF, the semantic information indicates that a field other than the primary key of the data table on the creating side of the BF is joined with the foreign key of the data table on the applying side of the BF, the semantic information indicates that the field other than the primary key of the data table on the creating side of the BF is joined with the field other than the foreign key of the data table on the applying side of the BF, the semantic information indicates that at least one of the primary key of the data table on the creating side of the BF or the foreign key of the data table on the applying side of the BF does not exists, or a filter predicate exists in the data table on the creating side of the BF.

7. The method of claim 1, further comprising:

in a case where it is determined to apply at least two BFs to a same data table associated with the join between the at least two data tables based on the target information, the at least two BFs including at least one first BF and at least one second BF, a filtering capacity of the at least one first BF being lower than a filtering capacity of the at least one second BF, discarding the at least one first BF before the join.

8. The method of claim 1, wherein the at least two subplans further include a second query plan, and the BF is applied to filter data of the first data table in both a first query plan and the second query plan, wherein the method further comprises pruning the second query plan, and pruning the second query plan includes:

determining that a cost of the second query plan is higher than a cost of the first query plan; and discarding the second query plan from the at least two subplans to obtain updated at least two subplans.

9. A computing device, comprising:

a memory; and at least one processor connected to the memory, wherein the memory is configured to store a computer program code, the computer program code including computer instructions; and the computer instructions, when executed by the at least one processor, cause the computing device to perform:

receiving a query that includes a request to join at least two data tables, the at least two data tables including a first data table and a second data table;

determining whether to create one or more additional subplans for scan of the first data table that include application of a bloom filter (BF) based on the second data table, based on a target information, wherein the target information includes semantic information of a join predicate between the at least two data tables, and wherein the target information further includes at least one of a filtering capacity represented by the join predicate corresponding to the join or a data amount of a data table associated with the join;

after the determining, generating one or more additional BF subplans for the scan of the first data table, wherein each BF subplan includes directives to:

create the BF based on the second data table; and apply the BF to the first data table for filtering data of the first data table before the first data table is joined with another data table, wherein each BF subplan includes a revised estimate of a number of rows and a cost for applying the BF such that the scan of the first data table includes at least two subplans, the at least two subplans include a BF subplan that includes the application of the BF, and a non-BF subplan that includes no BF;

submitting the at least two subplans to a cost-based bottom-up optimizer to obtain a target query plan; and providing, as a response to the query, a set of data that is retrieved from a data retrieval system by executing the target query plan, wherein the cost-based bottom-up optimizer considers the revised estimate of the number of rows and cost of the one or more additional BF subplans in comparison to the non-BF subplans and arrive at the target query plan with a different join order, join method, or other operations had the BF subplan not been included.

10. The computing device of claim 9, wherein the computer instructions, when executed by the at least one processor, cause the computing device to perform:

a first subplan of creating the BF including operations to:

for a join of the at least two data tables, scan the second data table; and create the BF based on the second data table;

a second subplan of applying the BF to the first data table including operations to:

scan the first data table; and apply the BF to a scan plan to filter data of the first data table, so as to obtain a plan where the BF is applied; and a third subplan of joining the first data table with the another data table including operations to:

join the filtered first data table and the another data table in the at least two data tables.

11. The computing device of claim 9, wherein the submitting the at least two subplans to the cost-based bottom-up optimizer to obtain the target query plan, includes:

submitting the at least two subplans to the cost-based bottom-up optimizer to obtain costs of at least two query plans, wherein a cost of a first query plan in the at least two query plans includes a cost of building the BF and the cost of applying the BF; and determining the target query plan based on the costs of the at least two query plans.

12. The computing device according to claim 9, wherein the join is used to join a data table on a creating side of the BF with a data table on an applying side of the BF out of the at least two data tables, and wherein the determining whether to create and apply the BF before the join based on the target information includes:

determining not to create the BF based on the data table on the creating side of the BF and not to apply the BF to the data table on the applying side of the BF before the join, in a case where the semantic information indicates that a primary key of the data table on the creating side of the BF is joined with a foreign key of the data table on the applying side of the BF and no filter predicate exists in the data table on the creating side of the BF.

13. The computing device according to claim 9, wherein the filtering capacity represented by the join predicate corresponding to the join, and the join is used to join a data table on a creating side of the BF with a data table on an applying side of the BF out of the at least two data tables, and wherein the determining whether to create and apply the BF before the join based on the target information includes:
   determining to create the BF based on the data table on the creating side of the BF and apply the BF to the data table on the applying side of the BF before the join if the filtering capacity represented by the join predicate corresponding to the join is greater than a capacity threshold in at least one case where:
   the semantic information indicates that a primary key of the data table on the creating side of the BF is joined with a field other than a foreign key of the data table on the applying side of the BF,
   the semantic information indicates that a field other than the primary key of the data table on the creating side of the BF is joined with the foreign key of the data table on the applying side of the BF,
   the semantic information indicates that the field other than the primary key of the data table on the creating side of the BF is joined with the field other than the foreign key of the data table on the applying side of the BF,
   the semantic information indicates that at least one of the primary key of the data table on the creating side of the BF or the foreign key of the data table on the applying side of the BF does not exists, or
   a filter predicate exists in the data table on the creating side of the BF.

14. The computing device according to claim 9, wherein and the data amount of the data table associated with the join, and the join is used to join two data tables out of the at least two data tables, wherein the two data tables include the data table on a creating side of the BF and the data table on an applying side of the BF, and wherein the determining whether to create and apply the BF before the join based on the target information includes:
   determining to apply the BF to a data table having a larger data amount in the two data tables before the join in at least one case where:
   the semantic information indicates that a primary key of the data table on the creating side of the BF is joined with a field other than a foreign key of the data table on the applying side of the BF,
   the semantic information indicates that a field other than the primary key of the data table on the creating side of the BF is joined with the foreign key of the data table on the applying side of the BF,
   the semantic information indicates that the field other than the primary key of the data table on the creating side of the BF is joined with the field other than the foreign key of the data table on the applying side of the BF,
   the semantic information indicates that at least one of the primary key of the data table on the creating side of the BF or the foreign key of the data table on the applying side of the BF does not exists, or
   a filter predicate exists in the data table on the creating side of the BF.

15. The computing device of claim 9, wherein the computer instructions, when executed by the at least one processor, cause the computing device to perform:
   in a case where it is determined to apply at least two BFs to a same data table associated with the join between the at least two data tables based on the target information, the at least two BFs including at least one first BF and at least one second BF, a filtering capacity of the at least one first BF being lower than a filtering capacity of the at least one second BF, discarding the at least one first BF before the join.

16. The computing device according to claim 9, wherein the at least two subplans further include a second query plan, and the BF is applied to filter data of the first data table in both a first query plan and the second query plan; and
   the computer instructions, when executed by the at least one processor, cause the computing device to further perform pruning the second query plan, wherein pruning the second query plan includes:
   determining that a cost of the second query plan is higher than a cost of the first query plan; and
   discarding the second query plan from the at least two subplans to obtain updated at least two subplans.

17. A non-transitory computer-readable storage medium having stored computer instructions, wherein the computer instructions, when executed by a computing device, cause the computing device to perform:
   receiving a query that includes a request to join at least two data tables, the at least two data tables including a first data table and a second data table;
   determining whether to create one or more additional subplans for scan of the first data table that include application of a bloom filter (BF) based on the second data table, based on a target information, wherein the target information includes semantic information of a join predicate between the at least two data tables, and wherein the target information further includes at least one of a filtering capacity represented by the join predicate corresponding to the join or a data amount of a data table associated with the join;
   after the determining, generating, one or more additional BF subplans for the scan of the first data table, wherein each BF subplan includes directives to:
   create the BF based on the second data table; and
   apply the BF to the first data table for filtering data of the first data table before the first data table is joined with another data table; and
   join the first data table with the another data table, wherein each BF subplan includes a revised estimate of a number of rows and a cost for applying the BF such that the scan of the first data table includes at least two subplans, the at least two subplans include a BF subplan that includes the application of the BF, and a non-BF subplan that includes no BF;
   submitting the at least two subplans to a cost-based bottom-up optimizer to obtain a target query plan, wherein the cost-based bottom-up optimizer considers the revised estimate of the number of rows and cost of the one or more additional BF subplans in comparison to non-BF subplans and arrive at the target query plan with a different join order, join method, or other operations had the BF subplan not been included; and
   providing, as a response to the query, a set of data that is retrieved from a data retrieval system by executing the target query plan.

18. The non-transitory computer-readable storage medium of claim 17, wherein the computer instructions, when executed by the computing device, cause the computing device to perform:
- a first subplan of creating the BF including operations to: for a join of the at least two data tables,
- scan the second data table; and
- create the BF based on the second data table;
- a second subplan of applying the BF to the first data table including operations to:
- scan the first data table; and
- apply the created BF to a scan plan to filter data of the first data table, so as to obtain a plan where the BF is applied; and
- a third subplan of joining the first data table with the another data table including operations to:
- join the filtered first data table and the another data table in the at least two data tables.

\* \* \* \* \*

UNITED STATES PATENT AND TRADEMARK OFFICE
CERTIFICATE OF CORRECTION

| | | |
|---|---|---|
| PATENT NO. | : 12,450,233 B1 | Page 1 of 1 |
| APPLICATION NO. | : 18/747670 | |
| DATED | : October 21, 2025 | |
| INVENTOR(S) | : Cheng et al. | |

It is certified that error appears in the above-identified patent and that said Letters Patent is hereby corrected as shown below:

In the Claims

In Column 25, in Claim 14, Line 40, delete "and the" and insert -- the --.

In Column 26, in Claim 17, Line 41, delete "generating," and insert -- generating --.

In Column 27, in Claim 18, Line 12, after "apply the" delete "created".

Signed and Sealed this
Second Day of December, 2025

John A. Squires
*Director of the United States Patent and Trademark Office*